(12) United States Patent
Takiguchi et al.

(10) Patent No.: US 7,175,155 B2
(45) Date of Patent: Feb. 13, 2007

(54) CONTROL VALVE APPARATUS AND PRESSURE CIRCUIT

(75) Inventors: Kazuo Takiguchi, Ibaraki-ken (JP); Masami Ochiai, Atsugi (JP); Tsutomu Udagawa, Tsukuba (JP); Katsumi Ueno, Ibaraki-ken (JP); Takashi Yagyu, Ushiku (JP); Yukihiko Sugiyama, Tsuchiura (JP); Mitsuo Aihara, Ibaraki-ken (JP)

(73) Assignee: Hitachi Construction Machinery Co., Ltd., Tokyo (JP)

(*) Notice: Subject to any disclaimer, the term of this patent is extended or adjusted under 35 U.S.C. 154(b) by 53 days.

(21) Appl. No.: 11/111,754

(22) Filed: Apr. 22, 2005

(65) Prior Publication Data

US 2005/0242310 A1    Nov. 3, 2005

(30) Foreign Application Priority Data

Apr. 28, 2004   (JP) ............................. 2004-134545

(51) Int. Cl.
*F15B 11/02* (2006.01)
(52) U.S. Cl. ..................................................... 251/29
(58) Field of Classification Search ................. 251/28, 251/29
See application file for complete search history.

(56) References Cited

U.S. PATENT DOCUMENTS

| | | | | |
|---|---|---|---|---|
| 1,303,045 A | * | 5/1919 | Dieter ....................... 114/20.1 |
| 2,758,811 A | * | 8/1956 | Peterson ....................... 251/29 |
| 3,125,319 A | * | 3/1964 | Arbogast et al. ............. 251/29 |
| 4,019,713 A | * | 4/1977 | Deinlein-Kalb ............... 251/28 |
| 4,802,505 A | * | 2/1989 | Gemignani et al. .......... 137/492 |
| 6,644,346 B1 | * | 11/2003 | Conrads et al. ............. 137/491 |
| 6,802,339 B2 | * | 10/2004 | Conrads et al. ............. 137/491 |

FOREIGN PATENT DOCUMENTS

JP              427401          5/1992

* cited by examiner

*Primary Examiner*—J. Casimer Jacyna
(74) *Attorney, Agent, or Firm*—Mattingly, Stanger, Malur & Brundidge, P.C.

(57) ABSTRACT

The control valve apparatus holds a seat valve member in a position seated on a valve seat to thereby prevent a backward flow even if the pressure in the inlet chamber side becomes lower than the pressure in the outlet chamber side. With a pilot control valve member is in a closed state, when the pressure in the inlet chamber is higher, a pressurized medium is introduced to the control pressure chamber via a first valve unit and is cut off from the outlet chamber by a second valve unit. When the pressure in the outlet chamber is higher, the pressurized medium is introduced to the control pressure chamber via the second valve unit and is cut off from the outlet chamber by the first valve unit.

9 Claims, 6 Drawing Sheets

CONTROL VALVE APPARATUS AND PRESSURE CIRCUIT

BACKGROUND OF THE INVENTION

1. Field of the Invention

The present invention relates to a control valve apparatus of seat valve type, and more particularly to a control valve apparatus suitable for a construction machine and a pressure circuit suitable for a hydraulic circuit of a construction machine.

2. Description of the Related Art

A control valve apparatus of seat valve type has hitherto been practiced as a combination of a seat-type main valve and a pilot control valve. The control valve apparatus is employed in a construction machine, for example, such that it is disposed in a joint portion of a main circuit between a pressure source and an actuator, or in a joint portion of a main circuit between an actuator and a reservoir, thereby controlling the speed and direction at and in which the actuator is moved. One example of such a control valve apparatus is disclosed in Patent Reference 1; JP,B 4-27401. In this disclosed control valve apparatus, a control pressure chamber is formed at the backside of a seat-type main valve to bias the main valve in the valve closing direction. The inlet side of the main valve and the control pressure chamber are communicated with each other via a variable throttle having an opening amount that is changed depending on the displacement of the main valve. Further, the control pressure chamber is communicated with the outlet side of the main valve via a pilot line, and a pilot valve is disposed in the pilot line. The displacement of the main valve is thus controlled depending on the displacement of the pilot valve.

FIG. 10 shows a known control valve apparatus of seat valve type. A housing 1 forms therein a circular valve seat 2 and a cylindrical wall 3 extending from the valve seat 2 in the axial direction. A valve member 4 is disposed within the cylindrical wall 3 and slides as a cylindrical plunger with respect to the cylindrical wall 3. A throttle is formed in a channel 5 inside the valve member 4 and serves as a variable throttle of which opening amount is increased as the distance from the valve seat 2 to the valve member 4 movable away from or closer to the valve seat 2 increases. The channel 5 is formed of at least one cutout or groove extending in the axial direction, for example, and is formed in an outer wall surface of the valve member 4. In the closed position of the valve member 4 shown in FIG. 10, an edge of the groove 5 located away from the valve seat 2 is positioned slightly outward of a stepped portion of the cylindrical wall 3 surrounding the valve member 4, i.e., an edge 6 of the cylindrical wall 3 farthest away from the valve seat 2. With such an arrangement, at all times, i.e., even when the valve member 4 abuts against the valve seat 2, a small passage portion 9 is formed between an inlet chamber 7 and a control pressure chamber 8 at the backside of the valve member 4. Therefore, the pressure in the control pressure chamber 8 becomes equal to the pressure in the inlet chamber 7 when a pilot control valve 10 is fully closed. When the pilot control valve 10 is operated to allow passage of a pilot flow, a pressurized medium (hydraulic fluid) flows through the throttle in the channel 5, whereupon the seat valve member 4 is moved away from the valve seat 2 by a distance that is required for establishing balance among the pressure in the control pressure chamber 8 formed at the backside of the seat valve member 4 to bias it in the valve closing direction, the pressure in the inlet chamber 7, and the pressure in an outlet chamber 11. The pilot control valve 10 acts as an adjustable throttle such that, as a pilot flow rate passing through the pilot control valve 10 increases, the seat valve member 4 is moved away from the valve seat 2 by a larger distance and a main flow rate passing through the seat valve is increased. Then, when the pilot control valve 10 is fully opened, the flow rate passing through the seat valve is maximized.

FIG. 11 shows another known control valve apparatus of seat valve type. In FIG. 11, the same components as those in FIG. 10 are denoted by the same symbols. This control valve apparatus differs from that shown in FIG. 10 in positions of the inlet chamber 7 and the outlet chamber 11 and in shape of the channel 5, but it operates in the same manner as the control valve apparatus of FIG. 10.

In the related art described above, because the pilot flow rate passing through the pilot control valve 10 is a small part of the total flow rate, the pilot control valve 10 can be controlled by a small force. Accordingly, it is easy to remotely control the valve by using, e.g., an electric signal.

SUMMARY OF THE INVENTION

The known control valve apparatuses of seat valve type have problems as follows. When the control valve apparatus shown in FIG. 10 is disposed in a joint portion of a main circuit between a pressure source and an actuator and is used in a circuit in which the pressure source is connected to the inlet chamber 7 of the control valve apparatus and the outlet chamber 11 is connected to the actuator, the seat valve member 4 cannot be held in a position seated on the valve seat 2 even with the pilot control valve 10 held in a closed position, if a pressure Ps in the inlet chamber 7 becomes lower than a pressure Pr in the outlet chamber 11. This point will be described in more detail below.

Assuming that the effective pressure bearing area of an annular portion 4a of the seat valve member 4 positioned to face the inlet chamber 7 is As, the effective pressure bearing area of a seat portion 4b positioned to face the outlet chamber 11 is Ar, the effective pressure bearing area of a sliding portion 4c positioned to face the control pressure chamber 8 is Ac, the pressure in the inlet chamber 7 is Ps, the pressure in the outlet chamber 11 is Pr, and the pressure in the control pressure chamber 8 is Pc, the following relation is held based on balance among the effective pressure bearing areas As, Ar and Ac of the seat valve member 4:

$$Ac = As + Ar \quad (1)$$

Also, the following relation is held based on balance among the pressures acting on the seat valve member 4:

$$Ac \cdot Pc = As \cdot Ps + Ar \cdot Pr \quad (2)$$

For example, when the pilot control valve 10 is closed from a state where the pressure source is set to a high pressure and the pilot control valve 10 is operated to supply the actuator with the hydraulic fluid via the seat valve, the pressure Ps in the inlet chamber 7 and the pressure Pc in the control pressure chamber 8 become equal to each other because the inlet chamber 7 and the control pressure chamber 8 are both communicated with the channel 5. Thus, the following relation is resulted:

$$Ac \cdot Pc > As \cdot Ps + Ar \cdot Pr \quad (3)$$

Accordingly, the seat valve member 4 is closed and held in a position seated on the valve seat 2, thereby sealing off the hydraulic fluid on the load pressure side of the actuator. As a result, the actuator can be held not to operate in an unintended way.

However, when a switching valve or the like communicating with a reservoir is disposed, for example, in the joint portion of the main circuit connecting the pressure source and the control valve apparatus to each other and the pressure of the pressure source is reduced, the pressure Pc in the control pressure chamber 8 lowers, whereby the following relation is resulted:

$$Ac \cdot Pc < As \cdot Ps + Ar \cdot Pr \qquad (4)$$

Accordingly, the seat valve member 4 is opened and the hydraulic fluid is caused to flow backward.

Also, even when the pressure of the pressure source is held higher than the load pressure of the actuator and the seat valve member 4 is in the closed state, the seat valve member 4 is opened and the hydraulic fluid is caused to flow backward through the seat valve if the load pressure of the actuator is abruptly increased for some reason. This results in a problem that the actuator cannot be held as per intended.

When the control valve apparatus shown in FIG. 11 is disposed in the joint portion of the main circuit between the pressure source and the actuator and is used in a circuit in which the pressure source is connected to the inlet chamber 7 of the control valve apparatus and the outlet chamber 11 is connected to the actuator, there also occurs a similar problem to that in the control valve apparatus shown in FIG. 10 if the switching valve or the like communicating with the reservoir is disposed, for example, in the joint portion of the main circuit connecting the pressure source and the control valve apparatus to each other.

Thus, the above-described known control valve apparatuses cannot be employed in a circuit that is required to hold the pressure on the outlet chamber side, e.g., a pressure circuit that is required to hold the load pressure of the actuator as represented by a hydraulic circuit in a construction machine, or a pressure circuit in which the load pressure of the actuator is abruptly increased.

With the view of improving the known control valve apparatuses of seat valve type, it is an object of the present invention to provide a control valve apparatus which can hold a seat valve member in a position seated on a valve seat to thereby prevent a backward flow even if the pressure in the inlet chamber side is lower than the pressure in the outlet chamber side, and a pressure circuit using the control valve apparatus.

To achieve the above object, according to a first aspect of the present invention, there is provided a control valve apparatus comprising an inlet chamber and an outlet chamber both formed in a housing, a seat valve member slidably disposed in the housing and controlling the amount of an opening between the inlet chamber and the outlet chamber, a control pressure chamber formed in the housing at the backside of the seat valve member and biasing the seat valve member in a valve closing direction, a variable throttle formed in the seat valve member and having an opening which is communicated with the control pressure chamber and of which amount is changed depending on a displacement of the seat valve member, a first passage for communicating the inlet chamber and the variable throttle with each other, a pilot passage for communicating the control pressure chamber and the outlet chamber with each other, and a pilot control valve member disposed in the pilot passage, wherein the control valve apparatus further comprises a first valve unit disposed in the first passage and allowing a flow only in a direction from the inlet chamber toward the variable throttle; a second passage communicating with the control pressure chamber; a third passage communicating with the outlet chamber; and a second valve unit disposed between the second passage and the third passage and allowing a flow only in a direction from the outlet chamber toward the control pressure chamber.

With those features, in the state where the pilot control valve member is closed and no pilot flow rate is supplied, even when the seat valve member is closed to be held in a seated position and the pressure in the outlet chamber is higher the pressure in the inlet chamber, the pressure in the outlet chamber is applied to the control pressure chamber via the second valve unit, and the pressure in the control pressure chamber is cut off from the inlet chamber by the first valve unit, whereby the pressure in the control pressure chamber becomes substantially equal to the pressure in the outlet chamber. Due to a difference between pressure bearing areas of the seat valve member, therefore, the seat valve member can be held in the valve-closed state to prevent a backward flow through it. Also, in the state where the pilot control valve is opened and the seat valve member is opened, even when the pressure in the outlet chamber is abruptly increased to become higher than the pressure in the inlet chamber, the seat valve member can be held in the valve-closed state to prevent a backward flow through it.

According to a second aspect of the present invention, a portion of the seat valve member facing the inlet chamber is positioned at the outer side in the radial direction of a valve seat, and a portion of the seat valve member facing the outlet chamber is positioned at the inner side in the radial direction of the valve seat.

With that feature, a main flow rate is adjusted in a direction in which a pressurized medium passing through the seat valve member flows in with respect to the seat valve member. Further, in the state where the pilot control valve member is closed and no pilot flow rate is supplied, since the seat valve member is closed and held in the seated position, it is possible to prevent the pressurized medium from flowing through the seat valve member in the flowing-out direction.

According to a third aspect of the present invention, a portion of the seat valve member facing the inlet chamber is positioned at the inner side in the radial direction of a valve seat, and a portion of the seat valve member facing the outlet chamber is positioned at the outer side in the radial direction of the valve seat.

With that feature, a main flow rate is adjusted in a direction in which the pressurized medium passing through the seat valve member flows out with respect to the seat valve member. Further, in the state where the pilot control valve member is closed and no pilot flow rate is supplied, since the seat valve member is closed and held in the seated position, it is possible to prevent the pressurized medium from flowing through the seat valve member in the flowing-in direction.

According to a fourth aspect of the present invention, the first valve unit is provided inside the seat valve member.

With that feature, there is no need of providing the first passage in the housing, and hence the size of the housing can be reduced.

According to a fifth aspect of the present invention, a part of the first passage and the first valve unit are provided inside the housing.

With that feature, since the structure of the seat valve member is simplified, the volume and weight of the seat valve member can be reduced with ease, and the moving speed of the seat valve member can be increased.

According to a sixth aspect of the present invention, one or both of the second passage and the third passage are in common with a part of the pilot passage.

With that feature, since one or both of the second passage and the third passage are in common with a part of the pilot passage, the size of the housing can be reduced.

According to a seventh aspect of the present invention, the second valve unit and respective parts of the second passage and the third passage are provided inside the pilot control valve member, and the remaining parts of the second passage and the third passage are in common with the pilot passage.

With that feature, since the parts of the second passage and the third passage are in common with the pilot passage, the size of the housing can be reduced.

According to an eighth aspect of the present invention, the control valve apparatus further comprises a resilient member for applying a force to bias the seat valve member in the valve closing direction.

With that feature, even when the pressure in the inlet chamber, the pressure in the control pressure chamber, and the pressure in the outlet chamber are equal to one another, namely even when a valve opening force and a valve closing force both acting on the seat valve member are balanced, the seat valve member can be closed by the biasing force applied from the resilient member in the valve closing direction. As a result, reliability of the valve closing function can be increased.

According to a ninth aspect of the present invention, the inlet chamber is connected to a pressure source, the outlet chamber is connected to a load holding side port of an actuator, and the pressure circuit includes means for reducing a pressure of the pressure source when the control valve apparatus is closed.

With those features, even when the load of the actuator is increased and the load pressure becomes higher than the pressure of the pressure source, the pressurized medium can be prevented from flowing backward, and the load checking function can be developed. Further, even when the pressure of the pressure source is reduced, the pressurized medium can be prevented from flowing backward, and the load checking function can be developed.

Because the control valve apparatus and the pressure circuit of the present invention are constructed as described above, it is possible to realize the effect that could not be obtained with the related art, i.e., to hold the load pressure on the outlet pressure side and to prevent a backward flow of the pressurized medium.

DESCRIPTION OF THE PREFERRED EMBODIMENTS

Embodiments of the present invention will be described below with reference to the drawings.

Figure 1:
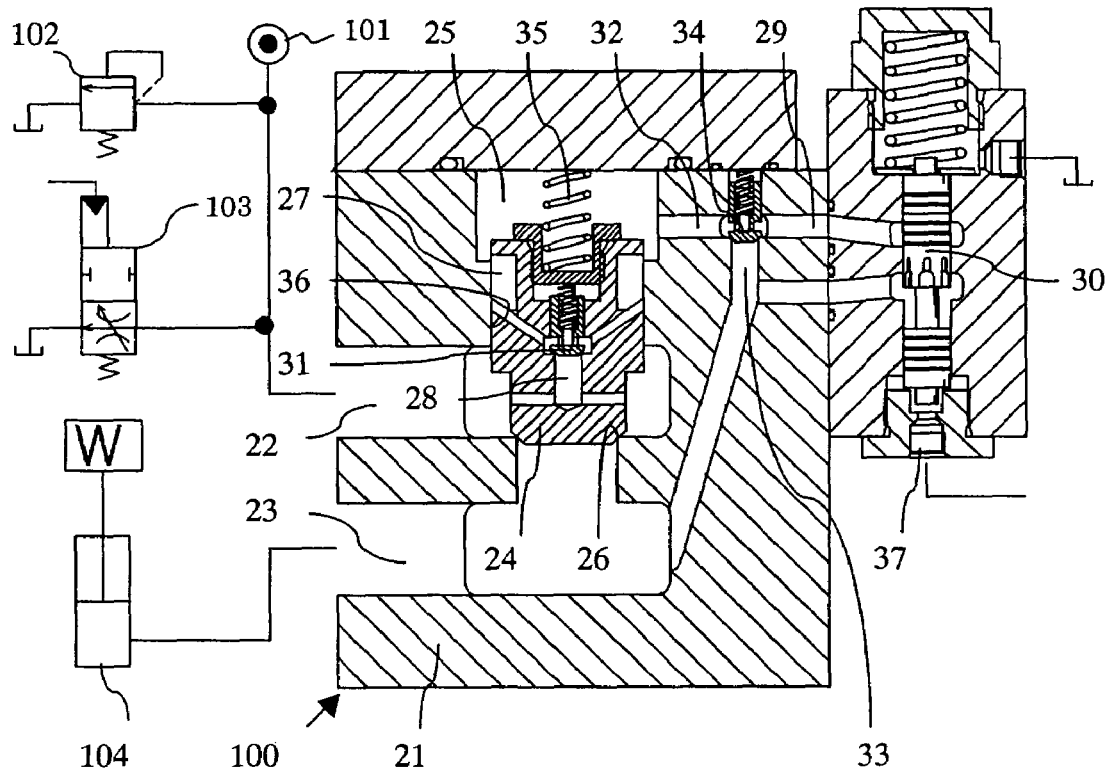
FIG. 1 shows a hydraulic system (pressure circuit) including a control valve apparatus according to a first embodiment of the present invention, the control valve apparatus being shown as a schematic sectional view and the other portion being shown as a hydraulic circuit diagram.
Figure 2:
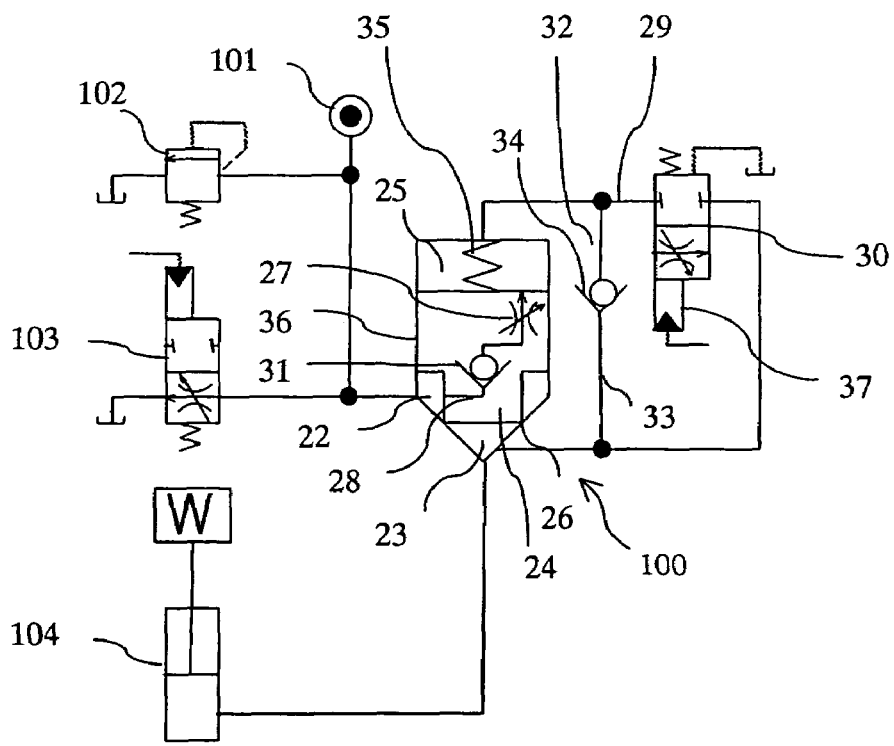
FIG. 2 shows the hydraulic system (pressure circuit) including the control valve apparatus according to the first embodiment of the present invention, the hydraulic system being entirely shown as a hydraulic circuit diagram.

A first embodiment of the present invention will be first described with reference to FIGS. 1 and 2. FIGS. 1 and 2 show a hydraulic system (pressure circuit) including a control valve apparatus according to the first embodiment of the present invention. In FIG. 1, the control valve apparatus is shown as a schematic sectional view and the other portion is shown as a hydraulic circuit diagram. In FIG. 2, the hydraulic system (pressure circuit) is entirely shown as a hydraulic circuit diagram.

Referring to FIG. 1 showing a control valve apparatus 100 of this first embodiment, the control valve apparatus 100 has a seat-type main valve, i.e., a seat valve member 24, slidably inserted in a housing 21, and controls the amount of an opening between an inlet chamber 22 and an outlet chamber 23 both formed in a housing 21. A control pressure chamber 25 for biasing the seat valve member 24 in the valve closing direction is formed at the backside of the seat valve member 24. A spring 35 for biasing the seat valve member 24 in the valve closing direction is disposed in the control pressure chamber 25, and the spring 35 is held by both the seat valve member 24 and the housing 21. The spring 35 is set such that it applies a preset force to the seat valve member 24 in the valve closing direction when the seat valve member 24 is in a position seated on a valve seat 26 formed in the housing 21, and the biasing force in the valve closing direction is increased as the distance through which the seat valve member 24 is moved increases. Further, until the distance through which the seat valve member 24 is moved reaches a maximum value, the spring 35 does not come into a state where spring coils are closely contacted with each other, and the biasing force in the valve closing direction is increased in proportion to the distance through which the seat valve member 24 is moved.

With such an arrangement, a control force taking part in the operation of opening and closing the seat valve member 24 is given by a resultant force of forces produced with pressures acting on the seat valve member 24 and the biasing force of the spring 35. Also, even when a valve opening force and a valve closing force produced with the pressures acting on the seat valve member 24 are in a balanced state, for example, when the sum of the pressure in the inlet chamber 22 and the pressure in the outlet chamber 23 is equal to the pressure in the control pressure chamber 25, the seat valve member 24 can be closed by the biasing force of the spring 35 in the valve closing direction, and reliability of the valve closing function is increased.

The seat valve member 24 forms therein a variable throttle 27 having an opening which is communicated with the control pressure chamber 25 and of which amount is changed depending on the displacement of the seat valve member 24, and having a slight opening amount even when the seat valve member 24 is in the position seated on the valve seat 26. The seat valve member 24 also forms therein a first passage 28 for communicating the inlet chamber 22 and the variable throttle 27 with each other, whereby the control pressure chamber 25 is communicated with the inlet chamber 22. In the first passage 28, there is disposed a first valve unit (check valve) 31 allowing a flow only in the direction from the inlet chamber 22 toward the variable throttle 27.

Because of the control pressure chamber 25 and the inlet chamber 22 communicating with each other even when the seat valve member 24 is in the seated position, as described above, if the pressure in the inlet chamber 22 is higher than the pressure in the outlet chamber 23, the pressure in the control pressure chamber 25 is slightly lower than the pressure in the inlet chamber 22, i.e., at a level resulting from subtracting the cracking pressure of the first valve unit 31 from the pressure in the inlet chamber 22. Due to the difference between the pressure bearing area of the seat valve member 24 subjected to the pressure in the inlet chamber 22 and the pressure bearing area of the seat valve member 24 subjected to the pressure in the control pressure chamber 25, therefore, the force for biasing the seat valve member 24 in the valve closing direction is so large that the seat valve member 24 can be held in the valve-closed state.

Further, the control valve apparatus 100 has a pilot passage 29 in which a pilot control valve member 30 is disposed. When the pilot control valve member 30 is opened, the control pressure chamber 25 is communicated with the outlet chamber 23. In addition to the pilot passage 29, another passage for communicating the control pressure chamber 25 and the outlet chamber 23 with each other is provided by a third passage 33 through which a second passage 32 communicating with the control pressure chamber 25 is communicated with the outlet chamber 23. Between the second passage 32 and the third passage 33, there is disposed a second valve unit (check valve) 34 allowing a flow only in the direction from the outlet chamber 23 toward the control pressure chamber 25. With the provision of the second valve unit 34, when the pressure in the outlet chamber 23 is higher than the pressure in the control pressure chamber 25, a hydraulic fluid (pressurized medium) flows in the direction from the outlet chamber 23 toward the control pressure chamber 25 regardless of whether the pilot control valve member 30 is opened or closed. Accordingly, the pressure in the control pressure chamber 25 rises to increase the valve closing force that biases the seat valve member 24 in the valve closing direction. When there is no pilot flow rate with the pilot control valve member 30 being in the valve-closed state, the seat valve member 24 is held in the seated position. When the pressure in the inlet chamber 22 is higher than the pressure in the outlet chamber 23, the pressure in the control pressure chamber 25 is slightly lower than the pressure in the inlet chamber 22, i.e., at a level resulting from subtracting the cracking pressure of the first valve unit 31 from the pressure in the inlet chamber 22, as described above. Due to the difference between the pressure bearing area of the seat valve member 24 subjected to the pressure in the inlet chamber 22 and the pressure bearing area of the seat valve member 24 subjected to the pressure in the control pressure chamber 25, therefore, the force for biasing the seat valve member 24 in the valve closing direction is so large that the seat valve member 24 can be held in the valve-closed state. Further, even when the pressure in the outlet chamber 23 is higher than the pressure in the inlet chamber 22, the hydraulic fluid flows into the control pressure chamber 25 through the second valve unit 34, and the hydraulic fluid in the control pressure chamber 25 is cut off from the inlet chamber 22 by the first valve unit 31. Therefore, the pressure in the control pressure chamber 25 is slightly lower than the pressure in the outlet chamber 23, i.e., at a level resulting from subtracting the cracking pressure of the second valve unit 34 from the pressure in the outlet chamber 23. As a result, due to the difference between the pressure bearing area of the seat valve member 24 subjected to the pressure in the outlet chamber 23 and the pressure bearing area of the seat valve member 24 subjected to the pressure in the control pressure chamber 25, the force for biasing the seat valve member 24 in the valve closing direction is so large that the seat valve member 24 can be held in the valve-closed state and a backward flow can be prevented.

The control valve apparatus 100 having the above-described functions is suitably used in a pressure circuit constructed as follows. The inlet chamber 22 is connected to a pressure source 101, and the hydraulic fluid is supplied from the pressure source 101 to the inlet chamber 22. A relief valve unit 102 for restricting a maximum pressure of the hydraulic fluid supplied from the pressure source 101 is disposed to prevent the control valve apparatus 100 from being broken by application of an excessively high pressure. A control valve unit 103 is controlled in conjunction with the control valve apparatus 100. More specifically, when the control valve apparatus 100 is closed, the control valve unit 103 is opened to communicate the pressure source 101 with a reservoir, thereby lowering the pressure in the circuit on the side closer to the pressure source 101. When an actuator 104 is operated, the control valve unit 103 is throttled to raise the pressure in the circuit, and the opening amount of the control valve unit 103 is adjusted to control the hydraulic fluid. When the control valve apparatus 100 is fully opened, the control valve unit 103 is closed to supply all the flow rate of the hydraulic fluid from the pressure source 101 to the control valve apparatus 100. The outlet chamber 23 is connected to a pressure holding side port of the actuator 104 such that the hydraulic fluid controlled by the control valve apparatus 100 is supplied from the outlet chamber 23 to the pressure holding side port of the actuator 104.

When the pilot control valve member 30 is operated to control the pilot flow rate, the stroke of the seat valve member 24 depending on the pilot flow rate is decided by the action of the variable throttle 27 having the opening which is communicated with the control pressure chamber 25 and of which amount is changed depending on the displacement of the seat valve member 24. It is therefore possible to control the amount of an opening between the inlet chamber 22 and the outlet chamber 23, which depends on the stroke of the seat valve member 24, and to adjust the main flow rate.

Further, there possibly occurs a case that a load W of the actuator 104 is abruptly increased in the state where the pilot control valve member 30 is opened and the seat valve member 24 is opened (i.e., where the hydraulic fluid is supplied to the actuator 104 and the actuator 104 is operated). As one example of such a case, it is here assumed that the control valve apparatus 100 of this embodiment is used as a control valve for driving an arm hydraulic cylinder in a hydraulic circuit of a hydraulic excavator, and excavation is performed with the arm crowding operation. When excavation is performed with the arm crowding operation, the load of the arm hydraulic cylinder (i.e., the load W of the actuator 104) is light and the arm hydraulic cylinder is operated at a speed corresponding to the supply flow rate of the hydraulic fluid before a bucket is bitten into the ground. Upon the bucket being bitten into the ground, however, the load of the arm hydraulic cylinder (i.e., the load W of the actuator 104) is abruptly increased.

Thus, in the event that the load W of the actuator 104 is increased and the pressure in the outlet chamber 23 becomes higher than the pressure in the inlet chamber 22 in the state where the pilot control valve member 30 is opened and the seat valve member 24 is opened, the hydraulic fluid in the outlet chamber 23 is going to flow into the inlet chamber 22 backward. At the same time, however, the hydraulic fluid in the outlet chamber 23 flow through the pilot passage 29 backward and is supplied to the control pressure chamber 25 via the pilot control valve member 30 and the second valve unit 34. Because the hydraulic fluid in the control pressure chamber 25 is cut off from the inlet chamber 22 by the first valve unit 31, the pressure in the control pressure chamber 25 rises and the seat valve member 24 is closed. Then, the pressure in the control pressure chamber 25 becomes substantially equal to the pressure in the outlet chamber 23. Due to the above-described difference between the pressure bearing areas, therefore, the seat valve member 24 is held in the valve-closed state and a backward flow can be prevented. It is hence possible to develop the load checking function and to avoid an unintended return of the actuator 104.

Immediately after the seat valve member 24 is closed by closing the pilot control valve member 30 from the state where the pilot control valve member 30 is operated to supply the hydraulic fluid to the actuator 104 while adjusting the main flow rate as described above, the pressure in the inlet chamber 22 and the pressure in the control pressure chamber 25 are equal to each other and are higher than the pressure in the outlet chamber 23. With the control valve unit 103 opened to communicate the pressure source 101 with the reservoir, however, the pressure in the circuit on the side closer to the pressure source 101 lowers and the pressure in the inlet chamber 22 also lowers, thus resulting in a pressure difference between the inlet chamber 22 and the control pressure chamber 25. This causes the hydraulic fluid to leak in the direction from the control pressure chamber 25 toward the inlet chamber 22 through a small annular clearance between respective sliding surfaces 36 of the housing 21 and the seat valve member 24. In the known control valve apparatus not including the second passage 32, the third passage 33 and the second valve unit 34 which are disposed in this embodiment of the present invention, when the pressure in the control pressure chamber 25 is reduced with the leakage of the hydraulic fluid in the direction from the control pressure chamber 25 toward the inlet chamber 22 and the force acting on the seat valve member 24 in the valve closing direction becomes smaller than the force acting on the seat valve member 24 in the valve opening direction, the seat valve member 24 is opened and the hydraulic fluid in the outlet chamber 23 flows into the inlet chamber 22 backward. Thus, the actuator 104 cannot be held as per intended. In this embodiment of the present invention, when the pressure in the control pressure chamber 25 is reduced and becomes lower than the pressure in the outlet chamber 23, the hydraulic fluid in the outlet chamber 23 flows through the third passage 33 and then the second passage 32 backward via the second valve unit 34, and is supplied to the control pressure chamber 25, whereby the pressure in the control pressure chamber 25 rises such that the pressure in the control pressure chamber 25 becomes substantially equal to the pressure in the outlet chamber 23. Due to the above-described difference between the pressure bearing areas, it is possible to maintain the state where the force acting on the seat valve member 24 in the valve closing direction is higher than the force acting on the seat valve member 24 in the valve opening direction. As a result, the seat valve member 24 can be held in the valve-closed state to prevent a backward flow, and an unintended return of the actuator 104 can be avoided.

Modifications of the first embodiment will be described below.

While, in the first embodiment shown in FIG. 1, the first passage 28 and the first valve unit 31 are provided in the seat valve member 24, the present invention is not limited to such layout. A part of the first passage 28 may be provided in the housing 21, and the remaining part of the first passage 28 and the first valve unit 31 may be provided in the seat valve member 24. In this case, the part of the first passage 28 provided in the seat valve member 24 is not directly connected to the inlet chamber 22 and is closed by the sliding surface 36 formed in the housing 21. On the other hand, the part of the first passage 28 provided in the housing 21 and having one end connected to the inlet chamber 22 has the other end that is opened to the sliding surface 36 and is always connected to the part of the first passage 28 provided in the seat valve member 24. As an alternative, the part of the first passage 28 and the first valve unit 31 may be both provided in the housing 21. Also in this case, the part of the first passage 28 provided in the housing 21 is always connected to the part of the first passage 28 provided in the seat valve member 24.

With the layout in which the first passage 28 and the first valve unit 31 are both provided in the seat valve member 24 as shown in FIG. 1, the first passage 28 is not required to be provided in the housing 21, and therefore the size of the housing 21 can be reduced. On the other hand, with the layout in which the part of the first passage 28 and the first valve unit 31 are both provided in the housing 21 as described above, the structure of the seat valve member 24 can be simplified. Consequently, the weight of the seat valve member 24 can be easily reduced with a reduction of the volume thereof, thus resulting in a higher moving speed of the seat valve member 24.

Other modifications of the first embodiment will be described below.

While, in the first embodiment shown in FIG. 1, the second passage 32 and the third passage 33 are in common with a part of the pilot passage 29, the present invention is not limited to such layout. The passage layout may be modified such that both the passages 32, 33 are provided separately from the pilot passage 29, or that the second passage 32 is formed in common with a part of the pilot passage 29 and the third passage 33 is provided separately, or that the third passage 33 is formed in common with a part of the pilot passage 29 and the second passage 28 is provided separately.

Figure 3:
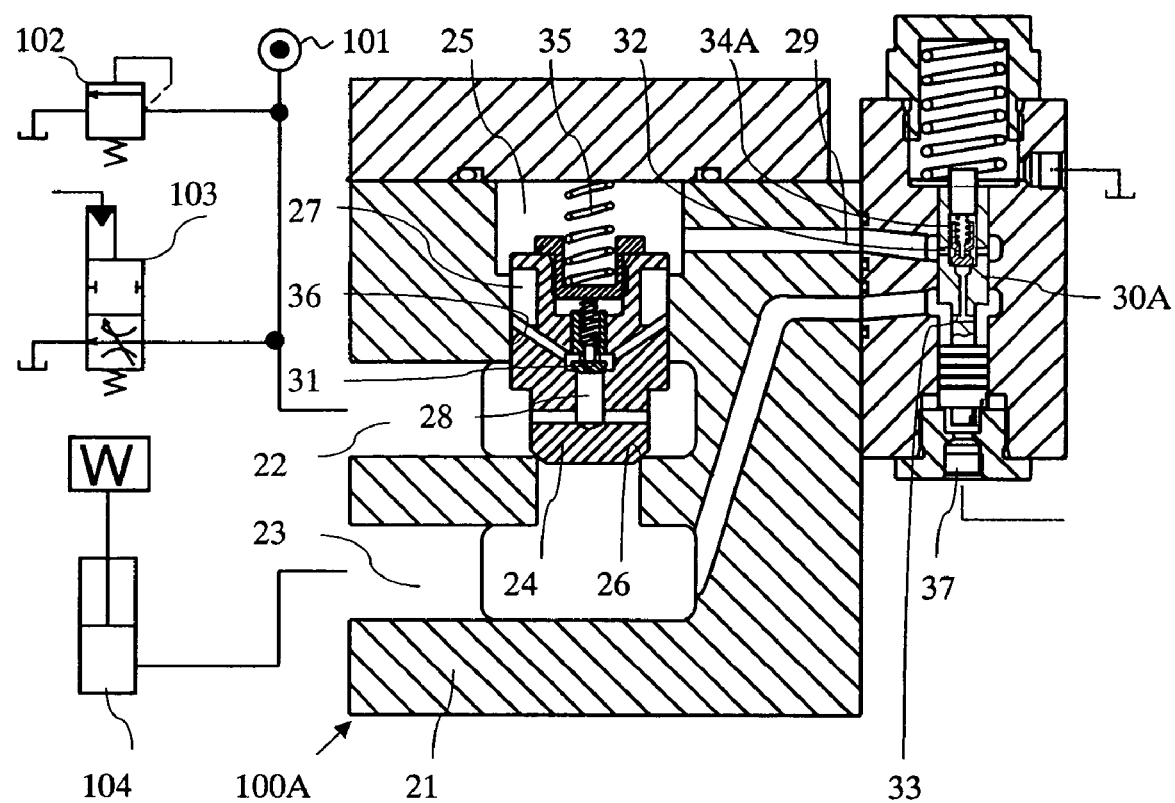
FIG. 3 shows a hydraulic system (pressure circuit) including a control valve apparatus according to a modification of the first embodiment of the present invention, the control valve apparatus being shown as a schematic sectional view and the other portion being shown as a hydraulic circuit diagram.

Further, the passage layout may be modified as shown in FIG. 3. In FIG. 3, the same components as those in FIG. 1 are denoted by the same symbols, and other components are denoted by affixing A to symbols that are used to denote the corresponding components in FIG. 1. In a control valve apparatus 100A according to the modification shown in FIG. 3, the second passage 32 and the third passage 33 are provided in a pilot control valve member 30A, and a second valve unit 34A is built in the pilot control valve member 30A.

According to the layout in which the pilot passage 29 is in common with both the second passage 32 and the third passage 33 as shown in FIG. 1, or the layout in which the pilot passage 29 is in common with the second passage 32 or the third passage 33, or the layout in which the second valve unit 34A is built in the pilot control valve member 30A as shown in FIG. 3, the structure can be easily made more compact and the number of the passages can be reduced. Therefore, the size of the housing 21 can be reduced, reliability in strength of the housing 21 can be increased, and a reduction in the number of machining steps and cost can be expected. Also, the modified layout of the pilot passage 29 being provided separately from the second passage 32 and the third passage 33 is advantageous in that respective cross-sectional areas of the pilot passage 29, the second passage 32 and the third passage 33 can be set without restricting one another, thus resulting in higher flexibility in sizes and shapes of the pilot control valve member 30 and the second valve unit 34. For example, by reducing the sizes of the pilot passage 29 and the pilot control valve member 30, the following advantage is obtained. Since the seat valve member 24 is controlled by a smaller amount of the hydraulic fluid, the pilot flow rate passing through the pilot control valve member 30 is even smaller than the main flow rate passing through the seat valve member 24. In other words, a gain is increased and the force required to operate the pilot control valve member 30 is reduced. Accordingly, instead of driving the pilot control valve member 30 by the pilot pressure introduced to a pilot port 37, the pilot control valve member 30 can be driven directly by a solenoid or the like, and hence electric control can be realized with ease. Further, by increasing the sizes of, for example, the second valve unit 34A, the second passage 32 and the third passage 33, the following advantage is obtained. When the load is abruptly increased and the pressure of the hydraulic fluid in the outlet chamber 23 becomes higher than the pressure of the hydraulic fluid in the inlet chamber 22, the hydraulic fluid in the control pressure chamber 25, which is required to close the seat valve member 24, can be supplied in a shorter time from the outlet chamber 23 via the third passage 33, the second valve unit 34 and the second passage 32 each having the increased size. As a result, the seat valve member 24 can be closed in a shorter time and the load checking function can be developed at a higher response.

Figure 4:
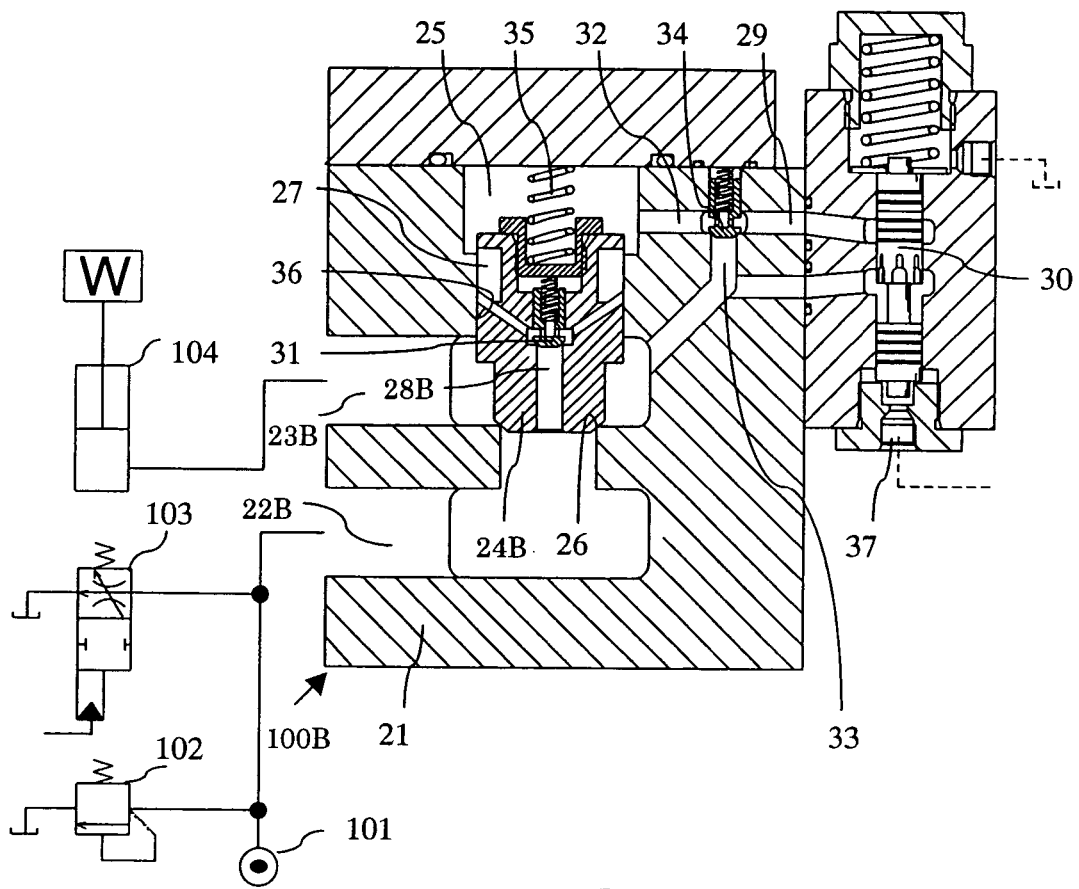
FIG. 4 shows a hydraulic system (pressure circuit) including a control valve apparatus according to a second embodiment of the present invention, the control valve apparatus being shown as a schematic sectional view and the other portion being shown as a hydraulic circuit diagram.
Figure 5:
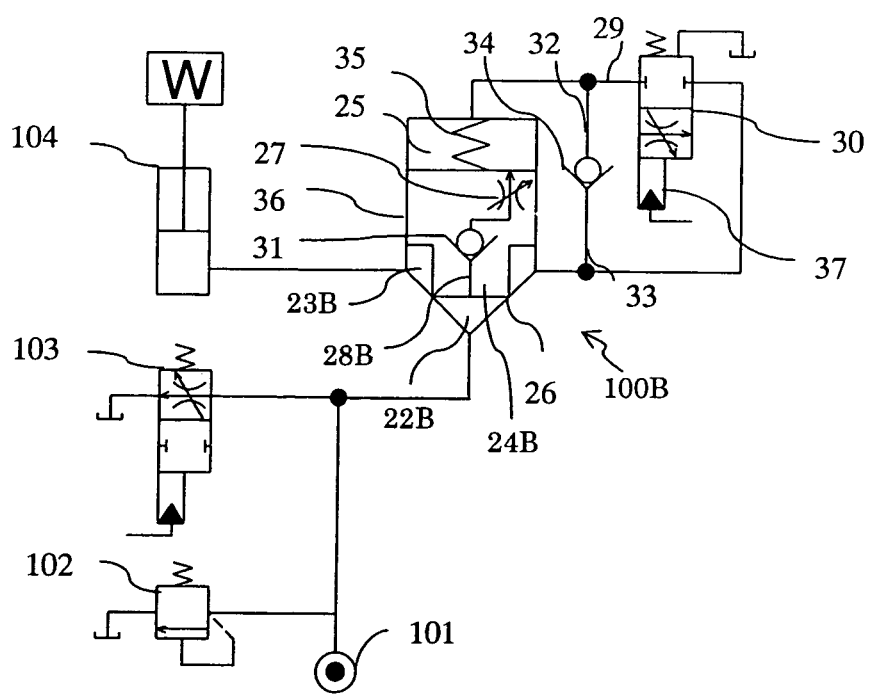
FIG. 5 shows the hydraulic system (pressure circuit) including the control valve apparatus according to the second embodiment of the present invention, the hydraulic system being entirely shown as a hydraulic circuit diagram.

A second embodiment of the present invention will be described below with reference to FIGS. 4 and 5. FIG. 4 shows a control valve apparatus according to the second embodiment as a schematic sectional view and the other portion as a hydraulic circuit diagram. FIG. 5 is a hydraulic circuit diagram showing an entire hydraulic system (pressure circuit) including the control valve apparatus according to the second embodiment. In FIGS. 4 and 5, the same components as those in FIGS. 1 and 2 are denoted by the same symbols, and other components are denoted by affixing B to the symbols that are used to denote the corresponding components in FIGS. 1 and 2. The second embodiment shown in FIGS. 4 and 5 differ from the first embodiment shown in FIGS. 1 and 2 in positions of an inlet chamber 22B and an outlet chamber 23B and in shape of a first passage 28B. The operation in the state of the pilot control valve member 30 being opened is the same as that in the first embodiment of FIGS. 1 and 2.

In the first embodiment of FIGS. 1 and 2, a portion of the seat valve member 24 facing the inlet chamber 22 is positioned at the outer side in the radial direction of the valve seat 26, and a portion of the seat valve member 24 facing the outlet chamber 23 is positioned at the inner side in the radial direction of the valve seat 26. In contrast, in this second embodiment of FIGS. 4 and 5, a portion of the seat valve member 24B facing the inlet chamber 22B is positioned at the inner side in the radial direction of the valve seat 26, and a portion of the seat valve member 24B facing the outlet chamber 23B is positioned at the outer side in the radial direction of the valve seat 26.

The first embodiment has solved the problem that the hydraulic fluid leaks in the direction from the control pressure chamber 25 toward the inlet chamber 22 and the pressure the control pressure chamber 25 lowers with the lapse of time from a time point immediately after the seat valve member 24 is closed by closing the pilot control valve member 30 from the state where the pilot control valve member 30 is operated to supply the hydraulic fluid to the actuator 104 while adjusting the main flow rate as described above. On the other hand, in the second embodiment, because the small annular clearance between the respective sliding surfaces 36 of the housing 21 and the seat valve member 24, through which the hydraulic fluid leaks in the first embodiment, is communicated with the outlet chamber 23B and the control pressure chamber 25, a pressure difference across the small annular clearance is small and lowering of the pressure in the control pressure chamber 25 caused by the leakage of the hydraulic fluid in the direction from the control pressure chamber 25 toward the outlet chamber 23B is stopped at a level higher than the pressure in the outlet chamber 23B. As a result, there occurs no problem. Conversely, when the pressure in the control pressure chamber 25 is lower than the pressure in the outlet chamber 23B, the leakage of the hydraulic fluid in the direction from the outlet chamber 23B toward the control pressure chamber 25 acts to suppress the lowering of the pressure in the control pressure chamber 25. At this time, however, the pressure in the control pressure chamber 25 is reduced due to leakage of the hydraulic fluid through an annular clearance in a sliding portion of the pilot control valve member 30. Therefore, the hydraulic fluid in the outlet chamber 23B flows through the third passage 33 and then the second passage 32 backward via the second valve unit 34, and is supplied to the control pressure chamber 25. As a result, the seat valve member 24B can be held in the valve-closed state to prevent a backward flow, and an unintended return of the actuator 104 can be avoided.

Figure 6:
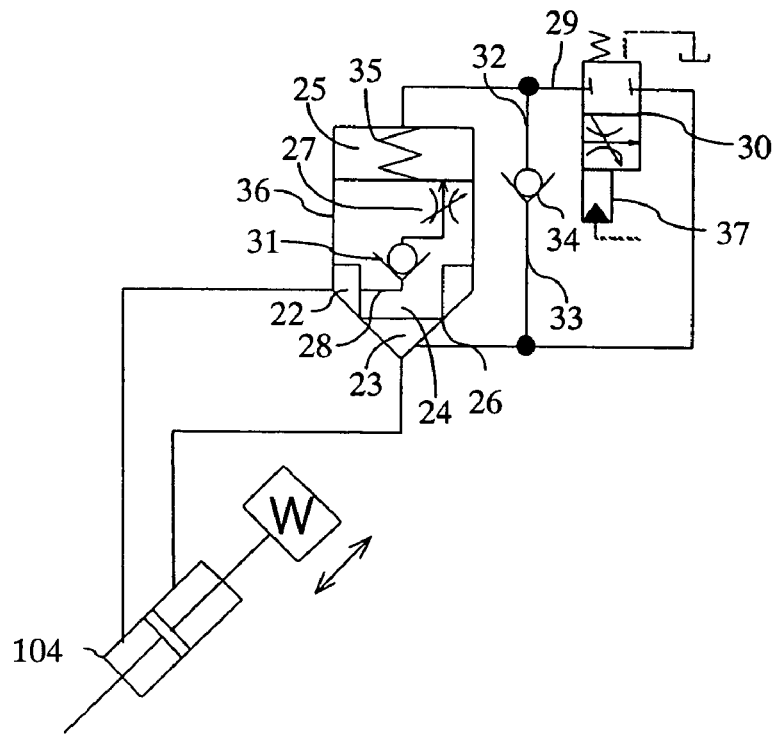
FIG. 6 shows a hydraulic system (pressure circuit) including a control valve apparatus according to a third embodiment of the present invention, the hydraulic system being entirely shown as a hydraulic circuit diagram.

A third embodiment of the present invention will be described below with reference to FIG. 6. The third embodiment of the present invention represents a modification of the first embodiment. As in FIG. 2, FIG. 6 is a hydraulic circuit diagram showing an entire hydraulic system (pressure circuit) according to the third embodiment. The third embodiment shown in FIG. 6 differs from the first embodiment shown in FIG. 2 in arrangement of the hydraulic circuit except for the control valve apparatus 100. The operation of the control valve apparatus 100 is the same as that shown in FIG. 2.

The inlet chamber 22 is connected to one port of the actuator 104, and the outlet chamber 23 is connected to the other port of the same actuator 104. Because a load pressure is produced at the port of the actuator 104 connected to the inlet chamber 22 due to the load W in a steady condition, the actuator 104 can be operated by opening the control valve apparatus 100 and can be held as per intended by closing the control valve apparatus 100. Further, even when a force acting in the tensile direction is applied to the actuator 104 upon, e.g., change in posture of the load W and the load holding side of the actuator 104 is reversed to the side of the port connected to the outlet chamber 23, the checking function is developed to prevent a backward flow of the hydraulic fluid, and the actuator 104 can be held as per intended. The two ports of the actuator 104 are connected to each other via an on/off valve (not shown). After the actuator 104 has been operated to reach its lowermost position due to the load W, the actuator 104 can be returned to the original position by lifting the load W while the on/off valve is opened.

Figure 7:
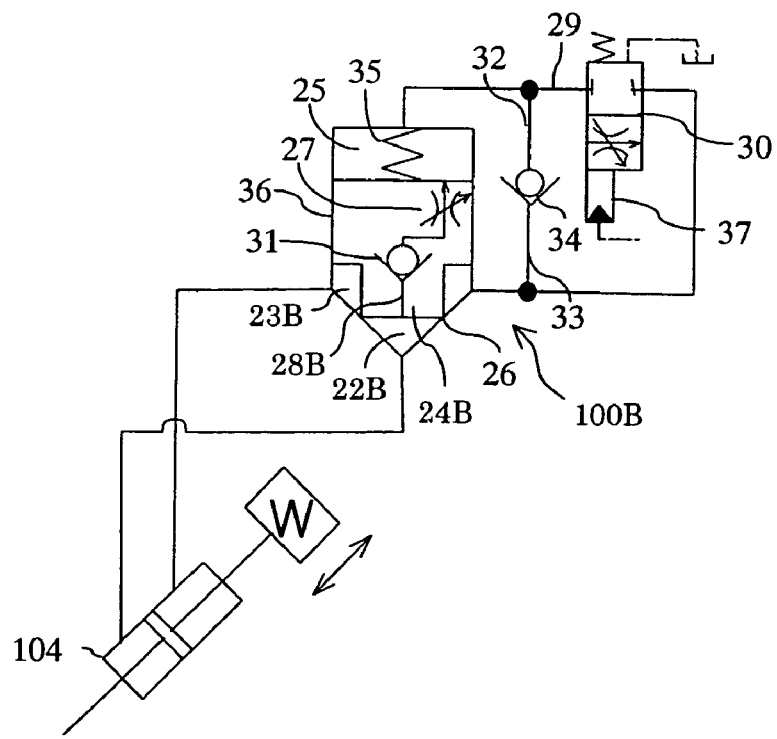
FIG. 7 shows a hydraulic system (pressure circuit) including a control valve apparatus according to a fourth embodiment of the present invention, the hydraulic system being entirely shown as a hydraulic circuit diagram.

A fourth embodiment of the present invention will be described below with reference to FIG. 7. The fourth embodiment of the present invention represents a modification of the second embodiment. As in FIG. 5, FIG. 7 is a hydraulic circuit diagram showing an entire hydraulic system (pressure circuit) according to the fourth embodiment. The fourth embodiment shown in FIG. 7 differs from the second embodiment shown in FIG. 5 in arrangement of the hydraulic circuit except for a control valve apparatus 100B. The operation of the control valve apparatus 100B is the same as that shown in FIG. 5.

Also, the arrangement of the pressure circuit except for the control valve apparatus 100B is the same as that shown in FIG. 6, and the pressure circuit is operated in the same manner as in the third embodiment of the present invention shown in FIG. 6. More specifically, because a load pressure is produced at the port of the actuator 104 connected to the inlet chamber 22B due to the load W in a steady condition, the actuator 104 can be operated by opening the control valve apparatus 100B and can be held as per intended by closing the control valve apparatus 100B. Further, even when a force acting in the tensile direction is applied to the actuator 104 upon, e.g., change in posture of the load W and the load holding side of the actuator 104 is reversed to the side of the port connected to the outlet chamber 23B, the checking function is developed to prevent a backward flow of the hydraulic fluid, and the actuator 104 can be held as per intended. The two ports of the actuator 104 are connected to each other via an on/off valve (not shown). After the actuator 104 has been operated to reach its lowermost position due to the load W, the actuator 104 can be returned to the original position by lifting the load W while the on/off valve is opened.

Figure 8:
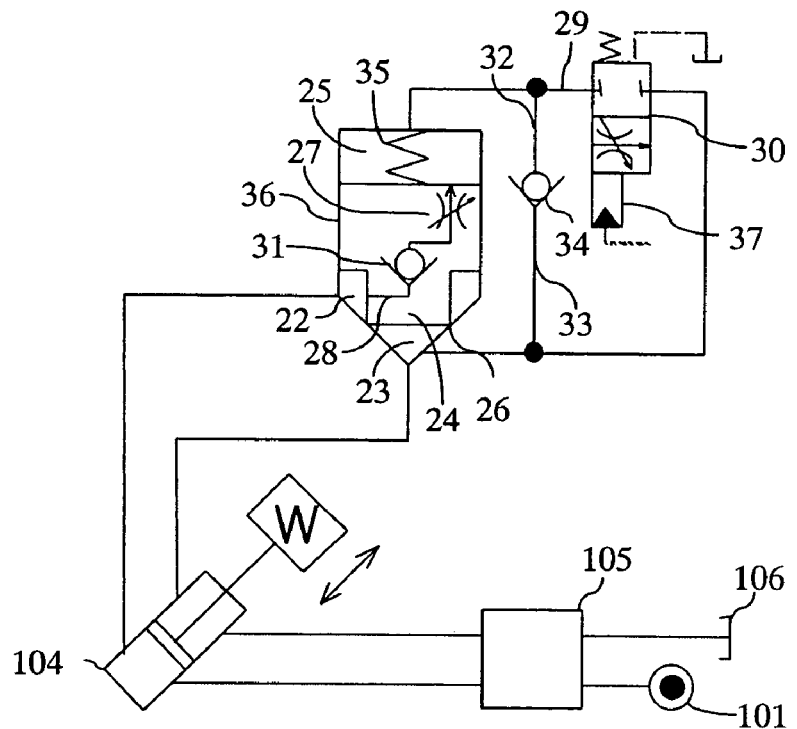
FIG. 8 shows a hydraulic system (pressure circuit) including a control valve apparatus according to a fifth embodiment of the present invention, the hydraulic system being entirely shown as a hydraulic circuit diagram.

A fifth embodiment of the present invention will be described below with reference to FIG. 8. The fifth embodiment of the present invention represents a modification of the first embodiment. As in FIG. 2, FIG. 8 is a hydraulic circuit diagram showing an entire hydraulic system (pressure circuit) according to the fifth embodiment. The fifth embodiment shown in FIG. 8 differs from the first embodiment shown in FIG. 2 in arrangement of the hydraulic circuit except for the control valve apparatus 100. The operation of the control valve apparatus 100 is the same as that in the first embodiment of FIG. 2.

The inlet chamber 22 is connected to one port of the actuator 104, and the outlet chamber 23 is connected to the other port of the same actuator 104. In addition to the circuit connecting the actuator 104 and the control valve apparatus 100 to each other, there is further provided a circuit connecting the pressure source 101 to a reservoir 106 via both the ports of the actuator 104 and a control valve 105. The pressure circuit operates as follows.

First, as with the operations of the third and fourth embodiments of the present invention, because a load pressure is produced at the port of the actuator 104 connected to the inlet chamber 22 due to the load W in a steady condition, the actuator 104 can be operated by opening the control valve apparatus 100 and can be held as per intended by closing the control valve apparatus 100. Further, even when a force acting in the tensile direction is applied to the actuator 104 upon, e.g., change in posture of the load W and the load holding side of the actuator 104 is reversed to the side of the port connected to the outlet chamber 23, the checking function is developed to prevent a backward flow of the hydraulic fluid, and the actuator 104 can be held as per intended.

Next, when the actuator 104 is operated by opening the control valve apparatus 100, the control valve 105 and the control valve apparatus 100 are operated at the same time. More specifically, when the actuator 104 is contracted in the direction opposed to the load W, the control valve apparatus 100 is operated to establish communication such that the hydraulic fluid at the load holding side port of the actuator 104 can be sent to the other port of the actuator 104. Accordingly, the actuator 104 can be operated by reusing pressure energy that acts to hold the load. In the case of the actuator 104 having a single rod cylinder, however, the sole operation of the control valve apparatus 100 causes a phenomenon that, because the pressure bearing surface and the capacity of the cylinder for the hydraulic fluid differs between two ports, the actuator 104 is stopped at a position where the pressure generated in the actuator 104 corresponds to the thrust acting on the actuator 104 due to the load W. In order to operate the actuator 104 beyond that position, therefore, the control valve 105 is operated at the same time as the control valve apparatus 100, thus enabling the hydraulic fluid to be returned to the reservoir 106 through at least one port of the actuator 104.

Additionally, when the actuator 104 is operated by opening the control valve apparatus 100, the actuator 104 can be operated at a higher speed by operating the control valve 105 and the control valve apparatus 100 at the same time such that the hydraulic fluid is returned to the reservoir 106 through the load holding side port of the actuator 104, which is connected to the inlet chamber 22, and the hydraulic fluid is supplied from the pressure source 101 to the other port of the actuator 104, which is connected to the outlet chamber 23.

On the other hand, when the actuator 104 is extended in the direction toward the load W, the control valve 105 is operated such that the hydraulic fluid controlled to have a pressure higher than the load holding pressure is supplied from the pressure source 101 to one port of the actuator 104, and the hydraulic fluid is returned to the reservoir 106 through the other port of the actuator 104. As a result, the operation of extending the actuator 104 can be realized.

Figure 9:
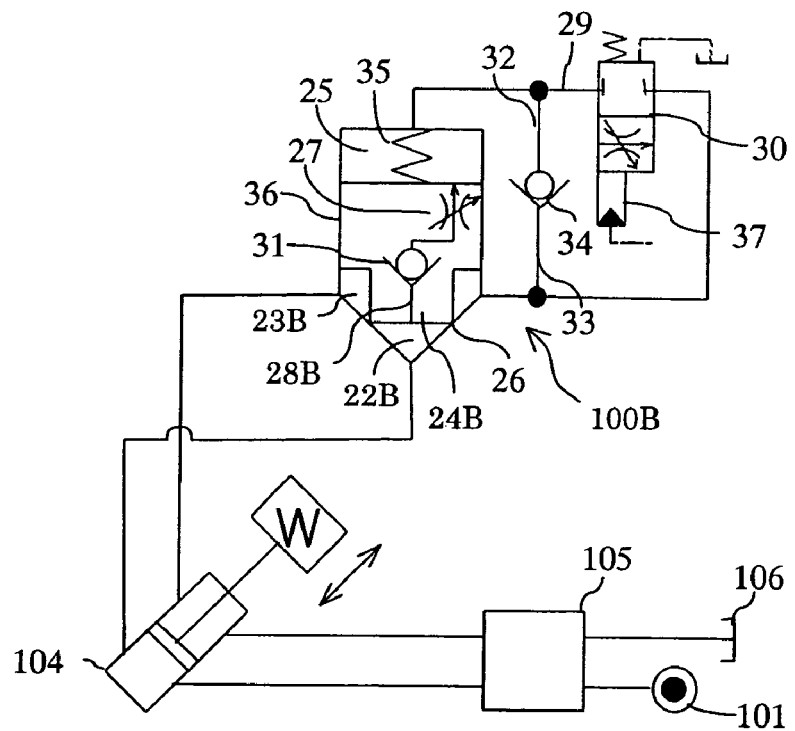
FIG. 9 shows a hydraulic system (pressure circuit) including a control valve apparatus according to a sixth embodiment of the present invention, the hydraulic system being entirely shown as a hydraulic circuit diagram.
Figure 10:
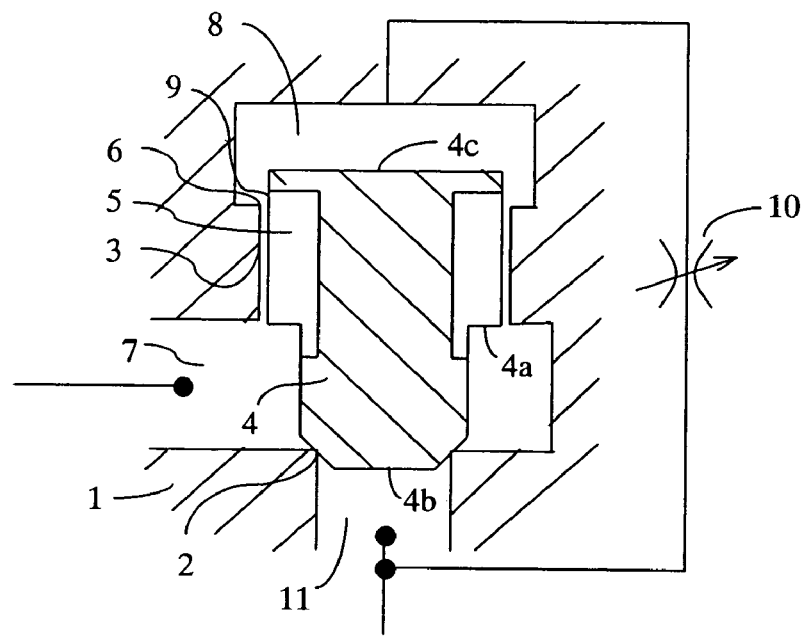
FIG. 10 is a schematic view showing one known control valve apparatus.
Figure 11:
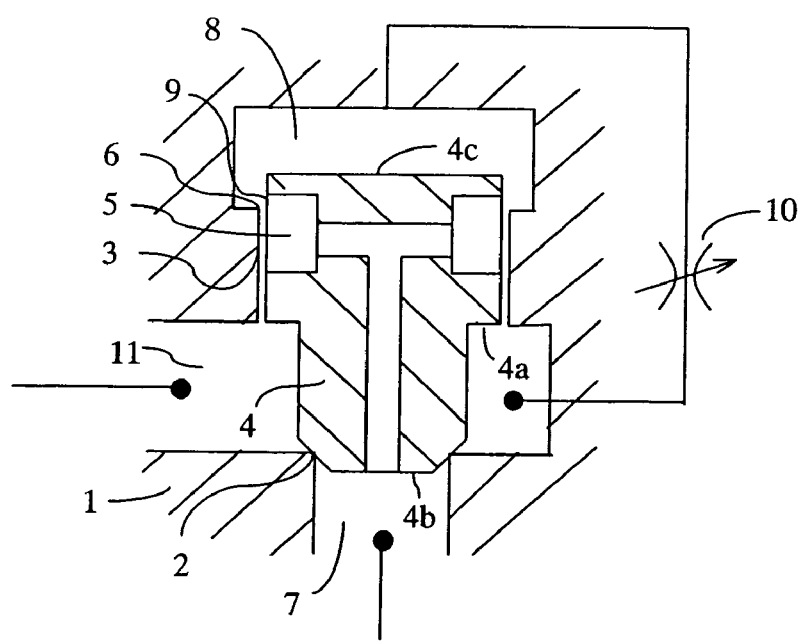
FIG. 11 is schematic view showing another known control valve apparatus.

A sixth embodiment of the present invention will be described below with reference to FIG. 9. The sixth embodiment of the present invention represents a modification of the second embodiment. As in FIG. 5, FIG. 9 is a hydraulic circuit diagram showing an entire hydraulic system (pressure circuit) according to the sixth embodiment. The sixth embodiment shown in FIG. 9 differs from the second embodiment shown in FIG. 5 in arrangement of the hydraulic circuit except for the control valve apparatus 100B. The operation of the control valve apparatus 100B is the same as that in the second embodiment of FIG. 5.

Further, the arrangement of the hydraulic circuit except for the control valve apparatus 100B is the same as that shown in FIG. 8, and the pressure circuit is operated in the same manner as in the fifth embodiment of the present invention shown in FIG. 8.

In the fifth and sixth embodiments, as shown in FIGS. 8 and 9, the circuit connecting the pressure source 101 and the reservoir 106 to the actuator 104 is connected directly to the two port of the actuator 104, but the present invention is not limited to that arrangement. The circuit connecting the pressure source 101 and the reservoir 106 to the actuator 104 may be joined to the circuit connecting the control valve apparatus 100 or 100B and the actuator 104 to each other so as to form a joining and branching circuit.

Also, in the first through sixth embodiments, as shown in FIGS. 1 through 5, the pilot control valve member 30 is driven by introducing the pilot pressure to the pilot pressure port 37, but the present invention is not limited to that arrangement. For example, the pilot control valve member 30 may be driven by directly pushing it by a manual lever. As an alternative, the pilot control valve member 30 may be driven by directly pushing it with energization of a solenoid or by remotely controlling it with an electric signal, etc., because the pilot flow rate passing through the pilot control valve member 30 is a part of the total flow rate passing through the control valve apparatus 100, 100A or 100B and is so small that the pilot control valve member 30 can be constructed in small size and controlled by a small force.

Further, the first through sixth embodiments represent the case where the present invention is applied to the hydraulic system employing the hydraulic fluid as a pressurized medium in the pressure circuit. However, the present invention is not limited to that case and is similarly applicable to any pressure circuits employing other types of pressurized media such as water pressure and pneumatic pressure.

Additionally, in the first through sixth embodiments, the term "pressure source 101" is a generic term representing a pump, an accumulator, an inertial load pressure source, a cylinder subjected to a load, etc. and is not limited to one of various types including constant pressure, variable pressure, fixed displacement, and variable displacement.

What is claimed is:

1. A control valve apparatus comprising an inlet chamber and an outlet chamber both formed in a housing, a seat valve member slidably disposed in said housing and controlling the amount of an opening between said inlet chamber and said outlet chamber, a control pressure chamber formed in said housing at the backside of said seat valve member and biasing said seat valve member in a valve closing direction, a variable throttle formed in said seat valve member and having an opening which is communicated with said control pressure chamber and of which amount is changed depending on a displacement of said seat valve member, a first passage for communicating said inlet chamber and said variable throttle with each other, a pilot passage for communicating said control pressure chamber and said outlet chamber with each other, and a pilot control valve member disposed in said pilot passage, wherein said control valve apparatus further comprises:

a first valve unit disposed in said first passage and allowing a flow only in a direction from said inlet chamber toward said variable throttle;

a second passage communicating with said control pressure chamber;

a third passage communicating with said outlet chamber; and a second valve unit disposed between said second passage and said third passage and allowing a flow only in a direction from said outlet chamber toward said control pressure chamber.

2. The control valve apparatus according to claim 1, wherein a portion of said seat valve member facing said inlet chamber is positioned at the outer side in the radial direction of a valve seat, and a portion of said seat valve member facing said outlet chamber is positioned at the inner side in the radial direction of said valve seat.

3. The control valve apparatus according to claim 1, wherein a portion of said seat valve member facing said inlet chamber is positioned at the inner side in the radial direction of a valve seat, and a portion of said seat valve member facing said outlet chamber is positioned at the outer side in the radial direction of said valve seat.

4. The control valve apparatus according to claim 1, wherein said first valve unit is provided inside said seat valve member.

5. The control valve apparatus according to claim 1, wherein a part of said first passage and said first valve unit are provided inside said housing.

6. The control valve apparatus according to claim 1, wherein one or both of said second passage and said third passage are in common with a part of said pilot passage.

7. The control valve apparatus according to claim 1, wherein said second valve unit and respective parts of said second passage and said third passage are provided inside said pilot control valve member, and the remaining parts of said second passage and said third passage are in common with said pilot passage.

8. The control valve apparatus according to claim 1, further comprising a resilient member for applying a force to bias said seat valve member in the valve closing direction.

9. A pressure circuit using the control valve apparatus according to claim 1, wherein said inlet chamber is connected to a pressure source, said outlet chamber is connected to a load holding side port of an actuator, and said pressure circuit includes means for reducing a pressure of said pressure source when said control valve apparatus is closed.

* * * * *